United States Patent
Riva et al.

(10) Patent No.: US 10,606,672 B2
(45) Date of Patent: Mar. 31, 2020

(54) MICRO-SERVICE FRAMEWORK DERIVED FROM THIRD-PARTY APPS

(71) Applicant: MICROSOFT TECHNOLOGY LICENSING, LLC, Redmond, WA (US)

(72) Inventors: Oriana Riva, Redmond, WA (US); Suman K. Nath, Redmond, WA (US); Douglas C. Burger, Bellevue, WA (US); Yongjian Hu, Riverside, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 366 days.

(21) Appl. No.: 15/587,311

(22) Filed: May 4, 2017

(65) Prior Publication Data
US 2018/0321996 A1 Nov. 8, 2018

(51) Int. Cl.
*G06F 9/54* (2006.01)
*G06F 9/455* (2018.01)
(Continued)

(52) U.S. Cl.
CPC ............. *G06F 9/547* (2013.01); *G06F 8/75* (2013.01); *G06F 9/45545* (2013.01); *H04L 67/20* (2013.01)

(58) Field of Classification Search
CPC ........... G06F 9/547; G06F 8/75; H04L 67/20; H04W 4/50
See application file for complete search history.

(56) References Cited

U.S. PATENT DOCUMENTS

| 7,873,537 B2 | 1/2011 | McQueeney et al. |
| 2012/0131559 A1* | 5/2012 | Wu .................... G06F 8/75 717/132 |

(Continued)

FOREIGN PATENT DOCUMENTS

| CN | 105577780 A | 5/2016 |
| WO | 2015084554 A1 | 6/2015 |

OTHER PUBLICATIONS

Arzt et al., "StubDroid: Automatic Inference of Precise Data-flow Summaries for the Android Framework" Proceedings of the 38th IEEE International Conference on Software Engineering, pp. 89-99 [retrieved from https://ieeexplore.ieee.org/abstract/document/7886831]. (Year: 2016).*

(Continued)

*Primary Examiner* — Brian W Wathen
(74) *Attorney, Agent, or Firm* — International IP Law Group, PLLC (57) ABSTRACT

Computer systems and methods for generating and interacting with a micro-service framework are provided. A micro-service corresponds to one or more deep link/API calls that carry out some particular function. A static analysis of an app is conducted, from one or more starting sources of the app to identify one or more valid and feasible execution paths, as well as corresponding input parameters within the app. Each valid execution path with corresponding input parameters represent a "deep link" or "API" for that app. The information regarding the deep link is collected and stored as a micro-service in a micro-service catalog. A micro-service framework is implemented that receives a micro-service request (i.e., a request that the micro-service be carried out on behalf of a computer user) from a UX client and executes that micro-service request via execution of the deep link.

19 Claims, 7 Drawing Sheets

(51) Int. Cl.
*H04L 29/08* (2006.01)
*G06F 8/75* (2018.01)

(56) References Cited

U.S. PATENT DOCUMENTS

| | | | |
|---|---|---|---|
| 2015/0081764 | A1 | 3/2015 | Zhao et al. |
| 2016/0124742 | A1* | 5/2016 | Rangasamy ............ H04L 47/70 |
| 2016/0357716 | A1 | 12/2016 | Douglas et al. |
| 2017/0091666 | A1 | 3/2017 | Rangasamy et al. |
| 2017/0282054 | A1 | 10/2017 | Barahoma |
| 2017/0289338 | A1 | 10/2017 | Riva et al. |
| 2018/0052664 | A1 | 2/2018 | Zhang et al. |
| 2018/0129484 | A1 | 5/2018 | Kannan et al. |
| 2018/0143857 | A1 | 5/2018 | Anbazhagan et al. |
| 2018/0247185 | A1 | 8/2018 | Chung et al. |
| 2019/0066694 | A1 | 2/2019 | Hirzel et al. |
| 2019/0213284 | A1 | 7/2019 | Anand et al. |

OTHER PUBLICATIONS

Klieber et al., "Android Taint Flow Analysis for App Sets", Proceedings of the 3rd ACM SIGPLAN International Workshop on the State of the Art in Java Program Analysis, pp. 1-6, [retrieved from https://dl.acm.org/citation.cfm?id=2614633] (Year: 2014).*

Lau, et al., "A Conversational Interface to Web Automation", In Proceedings of the 23rd Annual ACM Symposium on User Interface Software and Technology, Oct. 3, 2010, 10 Pages.

Lemon, et al., "An ISU Dialogue System Exhibiting Reinforcement Learning of Dialogue Policies: Generic Slot-filling in the TALK in-car System", In Proceedings of the 11th Conference of the European Chapter of the Association for Computational Linguistics: Posters & Demonstrations, Apr. 5, 2006, pp. 119-122.

Li, et al., "A Persona-based Neural Conversation Model", In Proceedings of the 54th Annual Meeting of the Association for Computational Linguistics, Mar. 19, 2016, 10 Pages.

Li, et al., "Adversarial Learning for Neural Dialogue Generation", In Proceedings of the Conference on Empirical Methods in Natural Language Processing, Sep. 9, 2017, 13 Pages.

Li, et al., "Deep Reinforcement Learning for Dialogue Generation", In Proceedings of the Conference on Empirical Methods in Natural Language Processing, Nov. 1, 2016, 11 Pages.

Li, et al., "DroidBot: a lightweight UI-guided test input generator for Android", In Proceedings of the 39th International Conference on Software Engineering Companion, Mar. 20, 2017, pp. 23-26.

Li, et al., "Kite: Building Conversational Bots from Mobile Apps", In Proceedings of the 16th Annual International Conference on Mobile Systems, Applications and Services, Jun. 10, 2018, 14 Pages.

Li, et al., "SUGILITE: Creating Multimodal Smartphone Automation by Demonstration", In Proceedings of the CHI Conference on Human Factors in Computing Systems, May 6, 2017, pp. 6038-6049.

Matney, Luca S. "Kik users have exchanged over 1.8 billion messages with the platform's 20,000 chatbots", Retrieved from: https://techcrunch.com/2016/08/03/kik-users-have-exchanged-over-1-8-billion-messages-with-the-platforms-20000-chatbots/, Aug. 3, 2016, 6 Pages.

Mitkov, et al., "Computer-aided Generation of Multiple-choice Tests", In Proceedings of the HLT-NAACL Workshop on Building Educational Applications Using Natural Language Processing, vol. 2, May 31, 2003, 6 Pages.

Nunez, Michael "The Amazon Echo Now Has 10,000 Mostly Useless 'Skills'", Retrieved from: https://gizmodo.com/the-amazon-echo-now-has-10-000-mostly-useless-skills-1792695362, Feb. 23, 2017, 3 Pages.

Orf, Darren "Facebook Chatbots Are Frustrating and Useless", Retrieved from: https://gizmodo.com/facebook-messenger-chatbots-are-more-frustrating-than-h-1770732045, Apr. 14, 2016, 4 Pages.

Papineni, et al., "BLEU: a method for automatic evaluation of machine translation", In Proceedings of the 40th Annual Meeting on Association for Computational Linguistics, Jul. 6, 2002, 8 Pages.

"International Search Report and Written Opinion Issued in PCT Application No. PCT/US2018/028223", dated Jul. 24, 2018, 13 Pages.

Banchs, Rafael E. "Movie-DiC: A Movie Dialogue Corpus for Research and Development", In Proceedings of the 50th Annual Meeting of the Association for Computational Linguistics: Short Papers—vol. 2, Jul. 8, 2012, pp. 203-207.

Ritter, et al., "Data-driven response generation in social media", In Proceedings of the Conference on Empirical Methods in Natural Language Processing, Jul. 27, 2011, pp. 583-593.

Rus, et al., "The First Question Generation Shared Task Evaluation Challenge", In Proceedings of the 6th International Natural Language Generation Conference, Jul. 7, 2010, 7 Pages.

Schwartz, Barry "Google: Chatbots Don't Make Your Pages Better", Retrieved from: https://www.seroundtable.com/google-on-chatbots-seo-24494.html, Sep. 20, 2017, 3 Pages.

Serban, et al., "Building End-to-end Dialogue Systems Using Generative Hierarchical Neural Network Models", In Proceedings of the Thirteenth AAAI Conference on Artificial Intelligence, Feb. 12, 2016, pp. 3776-3783.

Serban, et al., "Generating Factoid Questions With Recurrent Neural Networks: The 30M Factoid Question-Answer Corpus", In Proceedings of the 54th Annual Meeting of the Association for Computational Linguistics, Aug. 7, 2016, 13 Pages.

Shang, et al., "Neural Responding Machine for Short-Text Conversation", In Proceedings of the 53rd Annual Meeting of the Association for Computational Linguistics and the 7th International Joint Conference on Natural Language Processing of the Asian Federation of Natural Language Processing, Jul. 26, 2015, 12 Pages.

Shirazi, et al., "Insights into Layout Patterns of Mobile User Interfaces by an Automatic Analysis of Android Apps", In Proceedings of the 5th ACM SIGCHI Symposium on Engineering Interactive Computing Systems, Jun. 24, 2013, 10 Pages.

Sordoni, et al., "A Neural Network Approach to Context-Sensitive Generation of Conversational Responses", In Proceedings of the North American Chapter of the Association for Computational Linguistics: Human Language Technologies, Jun. 22, 2015, 11 Pages.

Sutskever, et al., "Sequence to Sequence Learning with Neural Networks", In Proceedings of the Advances in neural information processing systems, Dec. 8, 2014, pp. 1-9.

Vaswani, et al., "Attention Is All You Need", In Proceedings of the 31st Conference on Neural Information Processing Systems, Jun. 1, 2017, 11 Pages.

Vinyals, et al., "A Neural Conversational Model", In Proceedings of the 31st International Conference on Machine Learning, Jun. 19, 2015, 8 Pages.

Wang, et al., "A Dataset for Research on Short-Text Conversations", In Proceedings of the Conference on Empirical Methods in Natural Language Processing, Oct. 18, 2013, pp. 935-945.

Wang, et al., "A Simple and Generic Belief Tracking Mechanism for the Dialog State Tracking Challenge: On the believability of observed information", In Proceedings of the SIGDIAL Conference, Aug. 22, 2013, pp. 423-432.

Ward, et al., "Recent Improvements in the CMU Spoken Language Understanding System", In Proceedings of the Workshop on Human Language Technology, Mar. 8, 1994, pp. 213-216.

Weizenbaum, Joseph "ELIZA—A Computer Program for the Study of Natural Language Communication Between Man and Machine", In Journal of Communications of the ACM, vol. 9, No. 1, Jan. 1, 1966, pp. 1-7.

Welbl, et al., "Crowdsourcing Multiple Choice Science Questions", In Journal of the Computing Research Repository, Jul. 19, 2017, 13 Pages.

Wen, et al., "Stochastic Language Generation in Dialogue using Recurrent Neural Networks with Convolutional Sentence Reranking", In Proceedings of the 16th Annual Meeting of the Special Interest Group on Discourse and Dialogue, Sep. 2, 2015, 10 Pages.

Williams, et al., "Hybrid Code Networks: Practical and efficient end-to-end dialog control with supervised and reinforcement learn- (56) References Cited

OTHER PUBLICATIONS ing", In Proceedings of the 55th Annual Meeting of the Association for Computational Linguistics, Jul. 30, 2017, 13 Pages.
Yuan, et al., "Machine Comprehension by Text-to-Text Neural Question Generation", In Journal of the Computing Research Repository, May 4, 2017, pp. 1-14.
Cypher, Allen, Watch What I Do: Programming by Demonstration (MIT Press), Paperback, May 4, 1993, Abstract only, 1 page.
Ma, et al., "DroidLink: Automated Generation of Deep Links for Android Apps", In Journal of Computing Research Repository, May 23, 2016, pp. 1-21.
Deonier, et al., "Open Source Introducing DeepLinkDispatch: Easy Declaration and Routing of Your Deep Links", http://nerds.airbnb.com/deeplinkdispatch/, Published on: Jun. 30, 2015, 3 pages.
"Onelink", https://www.appsflyer.com/product/one-link-deep-linking/?utm_source=google&utm_medium=cpc&utm_term=deep%20linking&utm_content=ad1&utm_campaign=olink_dlink_Asia, Retrieved on: Mar. 3, 2017, 5 pages.
Pimenta, Carlos, "Moving Beyond Mobile Apps", http://blog.macquarium.com/moving-beyond-mobile-apps, Published on: Jul. 20, 2016, 13 pages.
Arzt, et al., "FlowDroid: Precise Context, Flow, Field, Object-sensitive and Lifecycle-aware Taint Analysis for Android Apps", In Proceedings of 35th Annual ACM SIGPLAN Conference on Programming Language Design and Implementation, Jun. 9, 2014, 11 pages.
Arzt, et al., "Data flow tracking components for Java", https://github.com/secure-software-engineering/soot-infoflow, Retrieved on: Mar. 9, 2017, 2 pages.
Arzt, et al., "Android-specific components of FlowDroid", https://github.com/AndroidTamer/soot-infoflow-android, Retrieved on: Mar. 9, 2017, 2 pages.
U.S. Appl. No. 15/087,973, Riva, et al., "Enabling Stateful Dynamic Links in Mobile Applications", filed Mar. 31, 2016.
"Actions on Google", Retrieved from: https://developers.google.com/actions/, Retrieved on: Jan. 18, 2018, 2 Pages.
"Alexa Skills Kit", Retrieved from: https://developer.amazon.com/alexa-skills-kit, Retrieved on: Mar. 7, 2018, 5 Pages.
"Amazon Lex", Retrieved from: https://aws.amazon.com/lex/, Retrieved on: Mar. 7, 2018, 11 Pages.
"Appsee", Retrieved from: https://www.appsee.com/, Retrieved on: Mar. 7, 2018, 7 Pages.
"BotsCrew", Retrieved from: https://web.archive.org/web/20171221061038/https://botscrew.com/, Dec. 21, 2017, 10 Pages.
"Dialogflow: Build natural and rich conversational experiences", Retrieved from: https://dialogflow.com/, Retrieved on: Mar. 8, 2018, 3 Pages.
"Flurry", Rerieved from: https://y.flurry.com/, Retrieved on: Mar. 8, 2018, 1 Pages.
"GoJS—Interactive JavaScript Diagrams in HTML", Retrieved from: https://gojs.net/latest/index.html, Retrieved on: Jan. 18, 2018, 4 Pages.
"Intent Utterance Expander", Retrieved from: https://lab.miguelmota.com/intent-utterance-expander/example/, Retrieved on: Mar. 8, 2018, 1 Page.
"Localytics", Retrieved from: https://www.localytics.com/, Retrieved on: Jan. 18, 2018, 2 Pages.
"Microsoft—Cognitive Services", Retrieved from: https://www.luis.ai/home, Retrieved on: Jan. 18, 2018, 7 Pages.
"Microsoft: Bot framework", Retrieved from: https://dev.botframework.com/, Retrieved on: Jan. 18, 2018, 1 Page.
"Miguelmota/intent-utterance-generator", Retrieved from: https://github.com/miguelmota/intent-utterance-generator, Jan. 26, 2016, 2 Pages.
"Support Library", Retrieved from: https://developer.android.com/topic/libraries/support-library/index.html, Retrieved on: Mar. 7, 2018,4 Pages.
"Watson", Retrieved from: https://web.archive.org/web/20170726060806/https://www.ibm.com/watson/developer/, Jul. 26, 2017, 9 Pages.
"What Users Say—Making Sure Alexa Understands What People are Saying", Retrieved from: https://developer.amazon.com/designing-for-voice/what-users-say, Retrieved on: Mar. 7, 2018, 8 Pages.
"Wit.ai", Retrieved From: https://wit.ai/, Retrieved on: Mar. 26, 2018, 1 Page.
Abadi, et al., "TensorFlow: A System for Large-scale Machine Learning", In Proceedings of the 12th USENIX Conference on Operating Systems Design and Implementation, vol. 16, Nov. 2, 2016, pp. 265-283.
Alharbi, et al., "Collect, Decompile, Extract, Stats, and Diff: Mining Design Pattern Changes in Android Apps", In Proceedings of the 17th International Conference on Human-Computer Interaction with Mobile Devices and Services, Aug. 25, 2015, 10 Pages.
Ali, et al., "Automation of question generation from sentences", In Proceedings of the Third Workshop on Question Generation, Jun. 18, 2010, pp. 58-67.
Aydin, et al., "Crowdsourcing for multiple-choice question answering", In Proceedings of the Twenty-Eighth AAAI Conference on Artificial Intelligence, Jul. 27, 2014, pp. 2946-2953.
Bobrow, et al., "GUS, A Frame-Driven Dialog System", In Journal of Artificial Intelligence, vol. 8, Issue 2, Apr. 1, 1977, pp. 155-173.
Bordes, et al., "Learning End-to-End Goal-Oriented Dialog", In Journal of the Computing Research Repository, May 1, 2016, pp. 1-15.
Chung, et al., "Empirical Evaluation of Gated Recurrent Neural Networks on Sequence Modeling", In Journal of the Computing Research Repository, Dec. 11, 2014, pp. 1-9.
Colby, et al., "Artificial Paranoia", In Journal of Artificial Intelligence, vol. 2, Issue 1, Mar. 1, 1971, pp. 1-25.
Laput, et al., "PixelTone: A Multimodal Interface for Image Editing", In Proceedings of the SIGCHI Conference on Human Factors in Computing Systems, May 2, 2013, pp. 2185-2194.
Deka, et al., "ERICA: Interaction Mining Mobile Apps", In Proceedings of the 29th Annual Symposium on User Interface Software and Technology, Oct. 16, 2016, pp. 767-776.
Deka, et al., "Rico: A Mobile App Dataset for Building Data-Driven Design Applications", In Proceedings of the 30th Annual ACM Symposium on User Interface Software and Technology, Oct. 22, 2017, pp. 845-854.
Deka, et al., "ZIPT: Zero-Integration Performance Testing of Mobile App Designs", In Proceedings of the 30th Annual ACM Symposium on User Interface Software and Technology, Oct. 22, 2017, pp. 727-736.
Dodge, et al., "Evaluating Prerequisite Qualities for Learning End-to-End Dialog Systems", In Proceedings of the International Conference on Learning Representations, May 1, 2016, pp. 1-16.
Doubrovkine, Daniel "GitHubalexa-js/alexa-utterances", Retrieved from: https://github.com/alexa-js/alexa-utterances, Retrieved on: Mar. 8, 2018, 3 Pages.
Du, et al., "Learning to ask: Neural question generation for reading comprehension", In Proceedings of the 55th Annual Meeting of the Association for Computational Linguistics, Apr. 29, 2017, 11 Pages.
Dunn, Jeff "Amazon's Alexa has gained 14,000 skills in the last year", Retrieved from: https://www.businessinsider.in/Amazons-Alexa-has-gained-14000-skills-in-the-last-year/articleshow/59464796.cms, Jul. 6, 2017,10 Pages.
Fernandes, et al., "Appstract: On-the-fly App Content Semantics with Better Privacy", In Proceedings of the 22nd Annual International Conference on Mobile Computing and Networking, Oct. 3, 2016, pp. 361-374.
Finkel, et al., "Incorporating Non-local Information into Information Extraction Systems by Gibbs Sampling", In Proceedings of the 43rd Annual Meeting on Association for Computational Linguistics, Jun. 25, 2005, pp. 363-370.
Fleiss, Joseph L. "Measuring nominal scale agreement among many raters", In Journal of Psychological Bulletin, vol. 76, Issue 5, Nov. 1, 1971, pp. 378-382.
Ghazvininejad, et al., "A Knowledge-Grounded Neural Conversation Model", In Journal of the Computing Research Repository, Feb. 7, 2017, 10 Pages.

(56) References Cited

OTHER PUBLICATIONS

Han, et al., "NLify: Lightweight Spoken Natural Language Interfaces via Exhaustive Paraphrasing", In Proceedings of the ACM International Joint Conference on Pervasive and Ubiquitous Computing, Sep. 8, 2013, 10 Pages.

Hao, et al., "PUMA: Programmable UI-Automation for Large-Scale Dynamic Analysis of Mobile Apps", In Proceedings of the 12th Annual International Conference on Mobile Systems, Applications, and Services, Jun. 16, 2014, 14 Pages.

Heyday.ai, Etienne Mérineau. "One year later, here's the state of the chatbot economy", Retrieved from: https://venturebeat.com/2017/06/11/one-year-later-heres-the-state-of-the-chatbot-economy/, Jun. 11, 2017, 86 Pages.

Hochreiter, et al., "Long Short-Term Memory", In Journal of Neural computation, vol. 9, Issue 8, Nov. 1, 1997, pp. 1-32.

Jen, Chef "Coffee Shop Chains That Make Mornings Bearable", Retrieved from: https://www.ranker.com/list/best-coffee-shop-chains/chef-jen?var=8&utm_expid=16418821-388.pwrOe5-ISJetLqzNW0S00A.3, Retrieved on: Jan. 18, 2018, 7 Pages.

Jurafsky, et al., "Dialog Systems and Chatbots", In Proceedings of the Speech and language processing, 2000, pp. 1-25.

Kalady, et al., "Natural language question generation using syntax and keywords", In Proceedings of the Third Workshop on Question Generation, Jun. 18, 2010, 95 Pages.

Kalchbrenner, et al., "Recurrent continuous translation models", In Proceedings of the Conference on Empirical Methods in Natural Language Processing, Oct. 18, 2013, pp. 1700-1709.

Kasturi, et al., "The Cohort and Speechify Libraries for Rapid Construction of Speech Enabled Applications for Android", In Proceedings of the 16th Annual Meeting of the Special Interest Group on Discourse and Dialogue, Sep. 2, 2015, pp. 441-443.

Koehn, et al., "Moses: Open source toolkit for statistical machine translation", In Proceedings of the 45th Annual Meeting of the ACL on Interactive Poster and Demonstration Sessions, Jun. 1, 2007, pp. 177-180.

Labutov, et al., "Deep Questions without Deep Understanding", In Proceedings of the 53rd Annual Meeting of the Association for Computational Linguistics, Jul. 26, 2015, pp. 889-898.

Landis, et al., "The measurement of observer agreement for categorical data", In Journal of Biometrics, vol. 33, Issue 1, Mar. 1, 1977, pp. 159-174.

Zhou, et al., "Neural Question Generation from Text: A Preliminary Study", In Journal of the Computing Research Repository, Apr. 1, 2017, 6 Pages.

"International Search Report and Written Opinion Issued in PCT Application No. PCT/US2019/033193", dated Aug. 21, 2019, 12 Pages.

"Non Final Office Action Issued in U.S. Appl. No. 16/002,915", dated Oct. 17, 2019, 11 Pages.

* cited by examiner

MICRO-SERVICE FRAMEWORK DERIVED FROM THIRD-PARTY APPS

BACKGROUND

More and more, people are utilizing their personal, mobile computing devices as their interface to the rest of the world. Currently, we rely upon apps (small, typically narrowly focused applications suitable for execution on the mobile computing device) to carry out various functions or execute desired services on our behalf. Of course, more often than not, completing some general task requires that the owner/user of a mobile device switches between multiple apps to accomplish the desired service/function.

By way of illustration, completing a general task on a mobile, such as "reserve a car for my ski trip to Park City," will very likely involve the execution of and coordination of information among several apps that are installed and executing on a person's computing device. For example, the generalized task will likely require the user to check a calendar app for specific dates of the trip to Park City. The user will also need to transfer the knowledge of the calendar app to one or more car rental apps, of course depending on whether the user checks multiple car rental agencies, in order to reserve a car. Also, as part of the reservation process, the person will also need to enter credit card information (that may or may not be stored by another app) to complete the reservation.

There is an effort to create user experience clients (UX clients), that include digital assistants such as Siri, Cortana, Google Now, as well as chat bots, that execute on and across the various computing devices of a person/user. The goal of the UX client, among other things, is to be able carry out generalized tasks on behalf of the user. However, current implementations of UX clients are limited in regard to their scope: they can only complete tasks to the extent of their programming/knowledge. For example and with reference to the generalized task above, a UX client may be sufficiently capable (in execution on the user's computing device as well as relying upon remote, back-end services) to identify that the generalized task is to reserve a car for the user, and further identify that the reservation will require information regarding the specific dates, as well as an area/location in which the car will be reserved. However, unless that UX client is encoded with the ability to interface with rental agencies, the UX client will not be able to complete the task.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, computer systems and methods for generating and interacting with a micro-service framework are provided. A micro-service corresponds to one or more deep link/API calls that carry out some particular function. A static analysis of an app is conducted, from a starting source of the app to identify a valid and feasible execution path, as well as corresponding input parameters within the app. This valid execution path and input parameters represent a "deep link" or "sink" for that app. The information regarding the deep link is collected and stored as a micro-service in a micro-service catalog. A micro-service framework is implemented that receives a micro-service request (i.e., a request that the micro-service be carried out on behalf of a computer user) from a UX client and executes that micro-service request via execution of the deep link.

According to embodiments of the disclosed subject matter, a computer-implemented method for identifying one or more micro-services of an app is presented. The method includes identifying a first starting source of a target app, where the first starting source comprises a starting execution point of the target app. An analysis is conducted of the target app with regard to the identified first starting source. As a result of the analysis of the target app, a first execution path is identified within the target app. This first execution path. Details regarding execution of the first execution path are captured as a micro-service and stored in a micro-service catalog.

According to another embodiment of the disclosed subject matter, a computer-implemented method for processing micro-service requests is presented. The method includes providing a micro-service catalog. As will be described in greater detail below, the micro-service catalog identifies a plurality of micro-services available for execution on behalf of a computer user, where each of the micro-services of the micro-service catalog corresponds to one or more application programming interface (API) calls to an online service. A request for a first micro-service of a computer user is received. One or more API calls of the first micro-service to an online service are identified. For each of the one or more API calls of the first micro-service, the API call is issued to the online service and the return results of the API call are processed for the computer user.

According to yet another embodiment of the disclosed subject matter, a computer system for processing micro-service requests is presented. The computer system comprises a processor and a memory, where the processor executes instructions stored in the memory as part of or in conjunction with additional components. These additional components include a micro-service request component and a micro-service framework. In execution, the micro-service request component is configured to receive a micro-service request of a computer user and identify an application programming interface (API) call of an online service corresponding to the requested micro-service. The identified API call of the online service is then executed by way of the micro-service framework. In execution, the micro-service framework is configured to receive an execution request regarding a micro-service of a computer user from the micro-service request component. In response, the micro-service framework executes the identified API call of the online service.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

As indicated above, the goal of a person's UX client is to carry out tasks on behalf of the person. By way of illustration and not limitation, a UX client may take the form of a digital assistant, also called a smart assistant, such as Microsoft's Cortana, Apple's Siri, or Google Now. Alternatively, a UX client may take the form of a chat bot, i.e., a computer program designed to interact with a person in a conversational manner. In any event, when the goal is to carry out tasks on behalf of a person, it follows that the effectiveness of a given UX client directly relates to the abilities that it has at its disposal. A UX client may not be encoded to provide calendaring features for its user. However, to the extent that the UX client can interface with the user's calendar service (whether the calendar service is a calendar app on the computing device, a calendar service operating online, or both), then the UX client can provide calendaring functionality for its user.

Interfacing with other apps, applications, and/or online services is something that a UX client can be programmed to accomplish. In this manner, to the extent that there are existing services with which the UX client can interface, the limits of the UX client lie in understanding what the user wants accomplished, not in whether or not the desired task can be accomplished. Unfortunately, while there are many applications and services that, collectively, perform a myriad of functions or services, access to these "services" is currently limited. For example, a car rental agency may provide an app that executes on a person's mobile device and through that app the person may be able to reserve a car. However, typically the car rental app is, in fact, a user-interface to an online service for renting cars. Similarly, a content viewing app on a computing device, such as the Netflix app by Netflix, Inc., is a user-interface to the company's online content streaming services.

The mobile app ecosystem is slowly being replaced by an ecosystem of APIs. In other words, more and more mobile apps are becoming nothing more than user-interfaces to various services, often to behind-the-scenes, online services. Ideally, each of these services would be accessible, as micro-services, to a personal UX client. There are reasons that app providers do not currently expose their services to third parties, including to those providers of UX client services. These reasons include, by way of illustration and not limitation, security concerns (e.g., threats to customer and/or proprietary data, as well as malware threats), monetary concerns (e.g., the ability to monetize proprietary content through the use of advertisements, or limit a service to paying customers), maintenance concerns (e.g., maintaining an external application programming interface (API) can be onerous, slow and costly), and the like. More often than not, as companies struggle to improve their services and offerings, it is simply too much trouble (in both cost and time) to maintain an API that third parties can utilize.

Rather than relying upon the app providers (or app/application providers) to provide APIs that a UX client may utilize, and according to aspects of the disclosed subject matter, a static analysis of apps and/or applications is conducted to identify "deep links," also referred to as "sinks," of the apps/applications. By way of definition, a "deep link" may be thought of as an API call and represents a valid and feasible execution path from a starting location of the app to the completion of the execution path. In many instances (though not all), this deep link may include a call to an executing process (or service) with regard to a particular function/operation. Thus, a deep link can be viewed as an API of a particular app, which may include a call to a remotely executing process or service. A more detailed discussion of the static analysis of apps and/or applications, as well as a discussion regarding a framework for utilizing the discovered deep links in the context of a digital assist is set forth below.

While a deep link/API call may be viewed as some functional element or aspect of an app, when isolated from the app, the functionality of that deep link may be more generally viewed as a service which, at times, may be desired by a computer user. In this context, a "micro-service" should be viewed as being a particular function that may be carried out/executed on behalf of a computer user (or by a computer user.) While each micro-service corresponds to at least one deep link/API call, this relationship may be a one-to-many relationship, i.e., one micro-service call may correspond to a plurality of deep link/API calls. Additionally, in some embodiments, the plurality of deep link/API calls that comprise a micro-service are not required to be implemented within the same app.

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users.

For purposes of clarity and definition, the term "application," as used in this document, should be interpreted as an executable collection of instructions designed to perform a group of coordinated functions, tasks, or activities for the benefit of a computer user. The term "app," as used in this document, should be interpreted as an executable collection of instructions, typically smaller in size and scope, designed to perform a specific function or related set of functions for the benefit of the computer user. Typically, though not exclusively, an app is designed to operate on mobile computing devices that have less computing capabilities and resources as other, more robust computing devices (such as desktop computers, laptop computers, etc.) Typically, though not exclusively, apps are encoded in a manner that they may be deployed across a variety of computing devices, whereas applications are encoded in a manner that they are processor specific.

According to aspects of the disclosed subject matter, static analysis techniques are deployed to discover deep links in apps across a variety of platforms (i.e., Android apps, IOs apps, etc.) More particularly, a static information flow analysis is performed on an app, beginning with the various starting points of the app, and systematically exploring all the feasible or valid execution paths from each starting point (i.e., each source) as well as input parameters. From each source, valid and feasible execution paths within the app are identified, where each valid, feasible execution path of the target app is termed a "sink" or "deep link." For example, when launching an app on a number mobile app execution frameworks (e.g., Android, iOS, Windows Mobile, etc.), the "launch" will typically load a page of the app (the source) by invoking a so-called page launcher method (e.g., the "startActivity" method in Android) which takes as input a description of the page to load. Using static information flow analysis and further using each launch page as a starting location, an analysis tool tracks how inputs to the page launcher method (e.g., intent objects in Android apps) propagate throughout the app in addition to the various inputs to render the app page. Capturing the various process flows allows for the identification of inputs to a specific source page, the type of input parameters (e.g., string, integers, etc.) and how these parameters are combined with other inputs (e.g., exclusive parameters) from within the app. Additional information can be also collected (possibly by combining the static analysis with a runtime analysis) to make inferences on the purpose of the extracted deep link/API. In the end, the static analysis identifies one or more deep links of the target app, as well as corresponding input parameters and their types. Return parameters (if any, including type and purpose) may also be identified through the static analysis and associated with the deep links.

In regard to the static analysis, those skilled in the art will appreciate that one of the challenges of static analysis is the identification of false positives, i.e., paths that cannot be feasibly reached. According to aspects of the disclosed subject matter, a path-selective taint analysis that leverages symbolic execution to reason about path constraints and reject any path that is infeasible and/or invalid. More particularly, path selectivity combines a precise static data-flow (taint) analysis with the control-abstraction power of symbolic execution, which yields an effective and efficient link extraction approach. In this manner, only valid, feasible paths are identified for further processing and inclusion in a micro-service catalog.

Advantageously, static analysis does not require concrete execution traces of an app or application. Indeed, the analysis reasons every program paths statically and, thus, has better coverage than dynamic analysis (examination of the app in execution) in nature, i.e., all paths may be examined rather than just those paths that are reached due to specific user inputs as may be the case under dynamic analysis. One practical issue in using static analysis is the occurrence of false positives. A false positive occurs if the path that static analysis reports or identifies is not feasible at runtime. To ameliorate the occurrence of false positives, the analysis further utilizes and/or is augmented by symbolic execution to reason about the constraints during path exploration. In one actual embodiment, satisfiability modulo theory (SMT) solvers are utilized to identify and abandon infeasible paths—a source of false positives. In one embodiment, a specially adapted version of the FlowDroid tool, as provided on the GitHub website, is utilized to conduct the static analysis. Advantageously, static analysis also scales better than dynamic analysis due, in large part, to the fact that multiple starting pages of a given target app can be analyzed in parallel, thus permitting large number of apps to be processed/analyzed in a reasonable amount of time.

In an actual embodiment, the analysis tool (an executable tool) is specially adapted to allow for forward symbolic execution. In this, the "source to sink" paths are path-insensitive, which means these paths ignore the control flow constraints along them. This design favors scalability due to the complexity of the path constraints but, potentially, sacrifices precision. For example, a page may fetch an integer called "id" contained in the page inputs by invoking the "pageInput.getIntExtra(id)" Android API under the constraint that the input "pageInput" also contains a constant called "Action" set to value "VIEW". When generating a link for this page, creating an "id" input parameter is not enough. There is also a need to specify that the "id" parameter is present under the constraint that the constant "Action" equals "VIEW." To generate such constraints, forward symbolic execution is leveraged. During path exploration, the symbolic executor collects the constraint along the path. When a branch point (e.g., an "if" or "switch" statement) is met, the symbolic executor forks the states of the path and creates the constraints for the "true" and "false" path of that branch point. When the post-dominator of this branch is met, the constraint is removed and the true/false path states are merged. Merging is desirable because it can efficiently prevent path explosion problems. When the sink points of the target app are reached, the deep links are identified by considering the path constraints that dominate the sink points. Note that the constraints can refer to values contained in the pageInput's data structure itself but could also consider other external variables.

In identifying input parameters to the various execution paths, it is very common for an app to maintain complex data structures, often includes tens or even hundreds of primitive-type fields. Exposing these complex data structures as input parameters would render any deep link difficult to invoke and/or use. However, typically only a few fields of a given complex data structure are used in any given deep link (i.e., execution path of source to sink). Knowing this, additional analysis, referred to as "taint analysis" is conducted, beginning with each source, to identify and track those fields of a complex data structure that are actually used. As those skilled in the art will appreciate, taint analysis is used, typically in regard to security, to identify whether information from a private/sensitive source is provided or sent (even after processing) to an insecure recipient. In regard to the present matter, the taint analysis is used, with the deep link as the "insecure recipient," to identify which elements/primitive types of a complex data structure are used. By identifying only those fields of the various data structures that are actually used, a significant reduction in complexity of input parameters can be achieved.

Another adaptation corresponds to Intent Delegation. Pages in a typical mobile app are loosely coupled and use parameters passed using the "PageLauncher" method to achieve dependency. Sometimes, an input (or a set of inputs) to a page, say Page B, is nested as a parameter inside another input that is passed to Page A, and then from Page A to Page B. When discovering input parameters of deep links, we need to know whether the input parameters are from the outside environment or from another internal page. To handle this situation, we adapt the analysis tool to statically build a Page Transition Graph. Moreover, the tool is further modified to perform the data flow analysis of the outside inputs along this graph. By this manner, more parameters of the existing deep links are located. Moreover, parameters can be marked as private (internal, provided by internal apps) or public.

And additional adaptation to the analysis tool is that the tool is adapted to analyze each page (e.g., an "Activity" for an Android app) of a target app instead of analyzing the whole app. This is because, typically, an app page is a single, focused user interface (UI) that interacts with the users. Each page provides some functionalities to users of the app. As such, each page is usually distinct from other pages of the same app such that the page's logic flow is separate from that of other pages.

Figure 1:
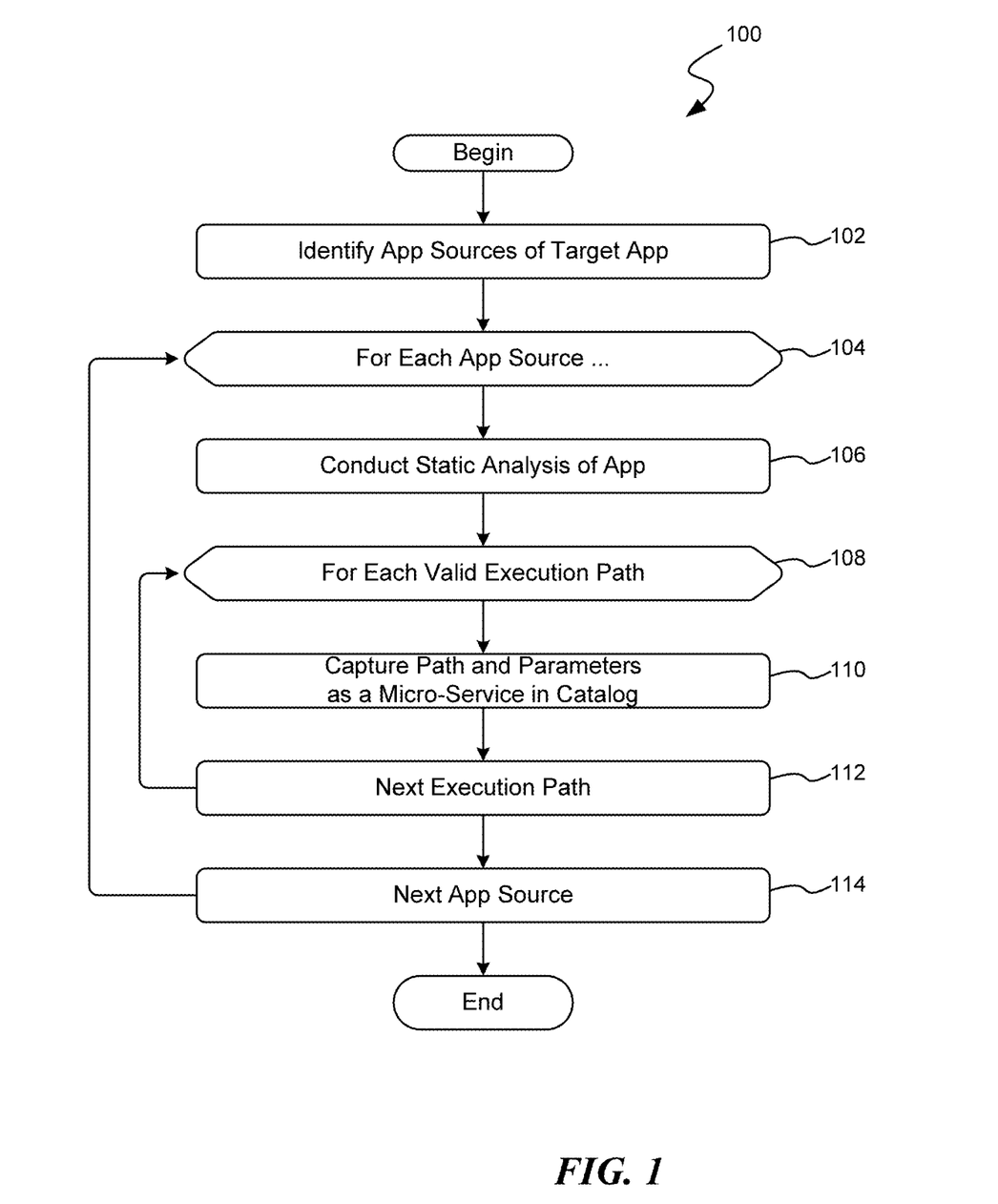
FIG. 1 is a flow diagram illustrating an exemplary routine for conducting a static analysis of a target app.

Turning now to the figures, FIG. 1 is a flow diagram illustrating an exemplary routine 100 for conducting a static analysis of a target app. Beginning at block 102, one or more starting sources of the app, i.e., starting locations by which the app is launched by a user, are identified. According to one embodiment, this identification may be determined according to an app manifest that is associated with the target app, in which the manifest identifies the starting points of the app to the executing framework (i.e., the operating environment within which the app executes.)

After identifying the one or more starting sources of the app, at iteration control 104, an iteration loop is conducted to iterate through each of the starting sources. As will become apparently, this iteration loop allows the static analysis to identify deep links that are accessible from each source. As a first step of the iteration loop and with regard to one of the identified starting sources, at block 106, the static analysis determines the execution flow from the starting source, identifying each valid, feasible execution path. Often, though not exclusively, an execution bath may include a call to a remote, online service. As discussed above, through this static analysis of all execution paths, valid and feasible paths are identified. Further, the analysis identifies input parameters for each execution path as well as inferences regarding a purpose/function.

At block 108, an iteration loop is begun to iterate through each of the valid execution paths identified by the analysis. Thus, at block 110, information regarding the execution path and parameters of a first iterated valid execution path, as well as any inferences regarding the execution path's function are captured as a micro-service in a micro-service catalog. At block 112, if there are additional value execution paths to process, the routine 100 returns to block 108 for additional processing. Alternatively, the routine 100 proceeds to block 114

After capturing the micro-services/deep links for the currently iterated app source, at block 114, the routine 100 returns to process another app source or, if there are no more to be processed, the routine 100 terminates.

According to aspects of the disclosed subject matter, conducting the static analysis, as outlined in routine 100, with regard to a plurality of apps will lead to a robust micro-service catalog that may be utilized by a UX client in carrying out one or more instructions from a computer user.

While the above routine 100 identifies the various deep links of a given app, which deep links are then stored as micro-services/APIs for subsequent use in a micro-service catalog, a logical task as issued by a user to a UX client may actually comprise multiple API calls. Consider the example of a content streaming site. If, using a corresponding content streaming app, the user wishes to view a list of recently released movies that the user has not already seen, this simple request may actual trigger multiple API calls to the remote, content streaming service. These multiple API calls may include, by way of illustration and not limitation, an API call with regard to user authentication, an API call with regard to recently released movies, and an API call with regard to movies that the user has already viewed. While a static analysis of the app may be sufficiently sophisticated to detect this condition, in various embodiments the logical tasks that require multiple API calls to a service (often a remote service) may be manually curated and then stored as a micro-service in the micro-service catalog. This manual curation may include having a particular person to manually identify multiple AP1's of a logical operation, or utilizing crowd-sourcing techniques to identify the various API calls of a logical operation. Once identified, the multiAPI operation is stored as a micro-service in the micro-service catalog.

Figure 2:
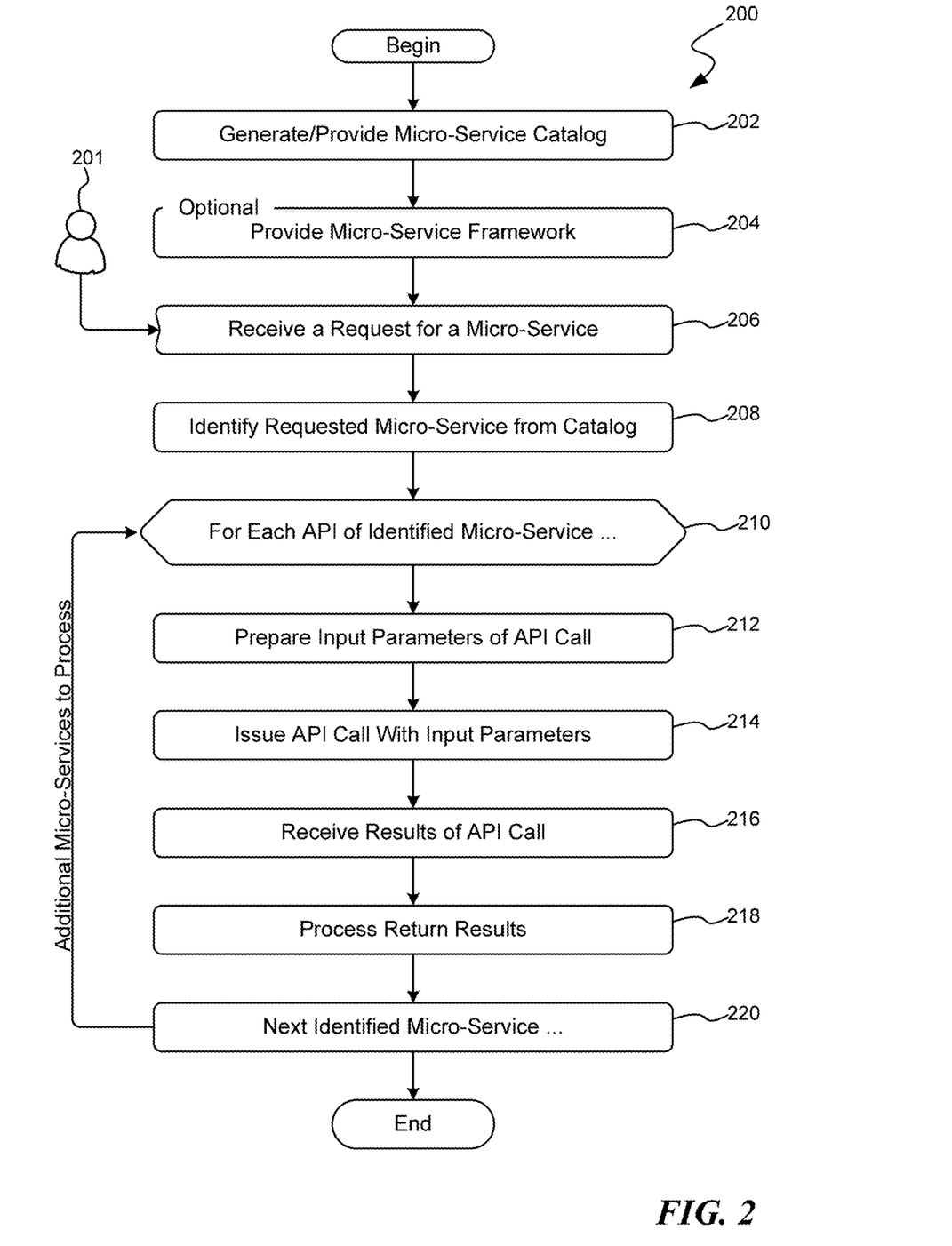
FIG. 2 is a flow diagram illustrating an exemplary routine for responding to a user request through the use of micro-services as found in a micro-service catalog.

In regard to a UX client utilizing micro-services on behalf of a user, reference is now made to FIG. 2. FIG. 2 is a flow diagram illustrating an exemplary routine 200 for responding to a user request through the use of micro-services as found in a micro-service catalog. Beginning at block 202, a micro-service catalog is generated and/or provided. The generation of a micro-service catalog is set forth above in regard to routine 100 of FIG. 1.

At block 204, a micro-service framework, i.e., a framework for executing micro-service requests from a UX client, is optionally provided. As will be discussed below, a micro-service framework may involve one or more apps operating on virtual machines, each app configured in a manner to execute the API (or APIs) of a given micro-service. Alternatively, however, a UX client may be configured to execute the various micro-services (i.e., directly and/or indirectly interact with the remote online services) within the micro-service catalog without additional support of the source app (i.e., the app from which the micro-service was derived) or executing framework.

At block 206, a request for a user, such as user 201, is received, the request corresponding to a desired function or service that can be accomplished through the use of one or more micro-services. In this regard, the multiple, request micro-services are not the same as a micro-service that invokes multiple APIs of a remote, online service, but rather reflects that a user's request may implicate multiple distinct micro-services to be completed. At block 208, the user request is mapped to one or more micro-services within the micro-service catalog. At block 210, an iteration loop is begun to iterate through the various identified micro-services for execution.

At block 212, input parameters are prepared in regard to the corresponding API call (or for multiple API calls). At block 214, the micro-service/API call is made in conjunction with input parameters (if any are required) to the app (or remote service). At block 216, the results of the API call (or API calls) are received.

With regard to blocks 212-216, depending on the particular implementation (i.e., whether the apps are executing on virtual machines within a specifically provided framework, or whether the UX client is configured to make the calls directly to an online services) the specifics of what process actually performs the preparation of input parameters, makes calls to the APIs, and receives results from the API calls may vary. More particularly, if a framework is provided that hosts apps operating on a virtual machine, then the preparation of the input parameters, calls to the deep links/APIs, and receipt of return results would likely be processed, at least in part or completely, by the corresponding apps. Alternatively, if the UX client is directly interacting with the online services, then the UX client would also be responsible for the various steps 212-216.

At block 218, the return results are then processed. Processing return results may include presenting information to the requesting user confirming that the request is completed, playing audio and/or visual content to the user per the request, or simply nothing at all as a request may anticipate that a desired action take place without any return "presentation" to make to the user.

At block 220, if there are additional identified micro-services to be processed, the routine 200 returns to block 210 where the next identified micro-service is selected for processing as set forth above. Alternatively, if there are no additional, identified micro-services to process, the routine 200 terminates.

Figure 3:
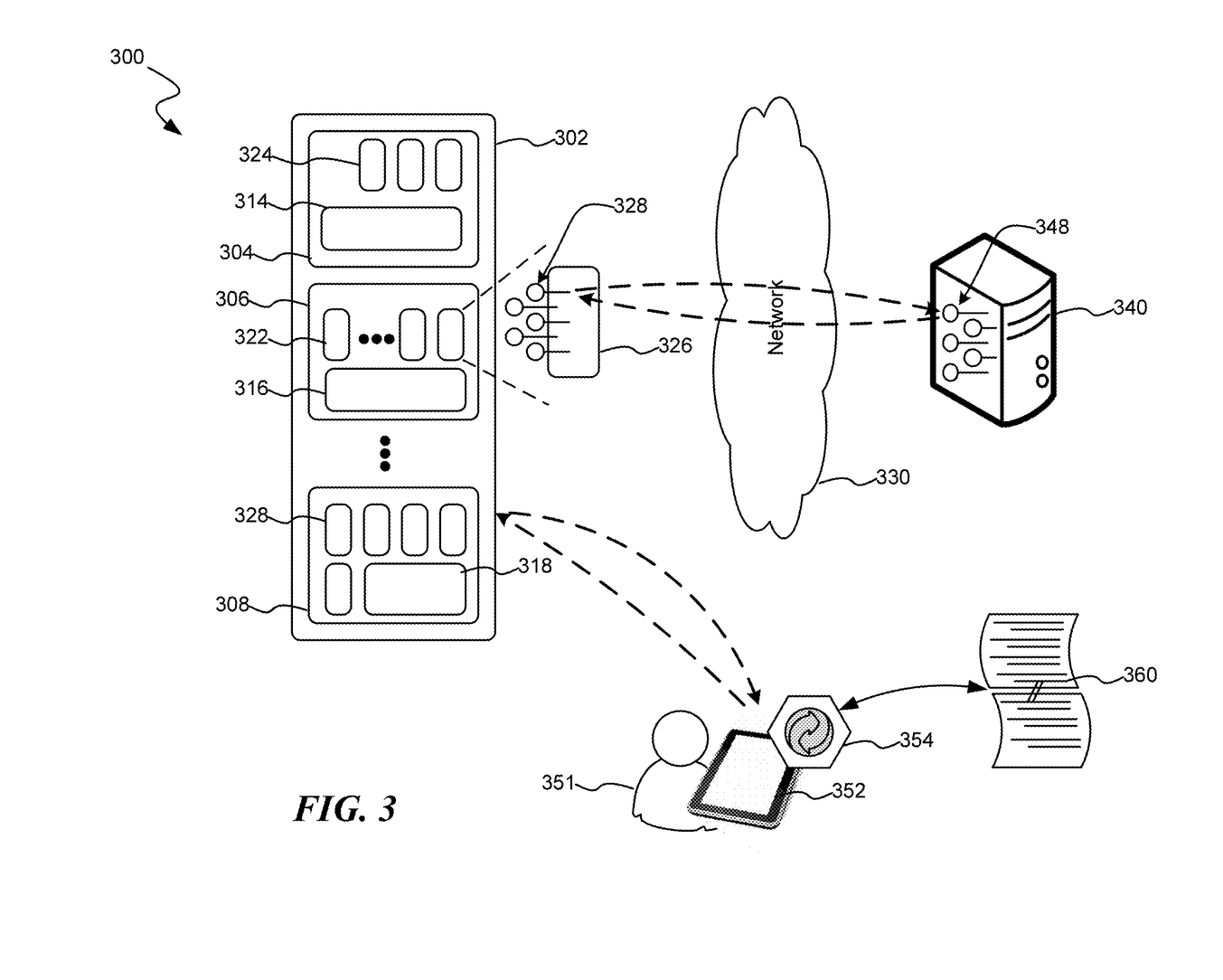
FIG. 3 is a pictorial diagram illustrating the interaction among various elements in the environment of a suitably configured micro-service framework.

As indicated above and according to aspects of the disclosed subject matter, a UX client operating on a computing device may be configured to execute the various API calls identified in the micro-service catalog without any additional assistance. On the other hand, in one embodiment a micro-service framework is provided in which a UX client, after having identified as desired micro-service, makes the various API calls through the framework, and particularly in regard to making the API calls via the corresponding app executing in the framework. Turning to FIG. 3, FIG. 3 is a pictorial diagram illustrating the interaction among various elements in the environment 300 of a suitably configured micro-service framework. More particularly, the environment 300 includes a micro-service framework 302 hosting a plurality of executing operating environments, such as operating environments 304-308, where each operating environment executes by way of a corresponding virtual machine provided by the framework, such as virtual machines 314-318.

Each of the operating environments executing within the framework 302 includes or hosts one or more apps, such as apps 322-326, where each app executes on the virtual machine hosting the operating system in which the app executes, all of which is hosted by the micro-service framework 302, in much the same way as there may be multiple apps executing within an operating system on a computing device.

In operation, a user 351 may make a request from a UX client 354 executing on the user's mobile computing device 352. The UX client 354 interprets the request and identifies one or more micro-services, as identified in a micro-service catalog 360, to carry out the user's request. According this this embodiment, the UX client 354 then submits the micro-service request to the micro-service framework 302. The submitted request includes information sufficient for the framework to identify the app that implements the micro-service, such as app 326 executing in operating environment 306. Additionally, the submitted request further includes information that identifies the particular deep link/API, such as API 328, for carrying out the requested task. The framework then executes a call on the deep link/API that, in turn, generates any input parameters to a corresponding, remote API 348 and then executes the call to that API that is hosted by remote, online service executing on a remote computing system, such as remote computing system 340. Return parameters, if are provided back to the identified app 326 which, in turn, may be provided to the UX client 354 for presentation to the computer user 301.

According to aspects of the disclosed subject matter, access to the micro-service framework 302 (i.e., micro-service requests) are platform independent or platform agnostic: interaction with the micro-service framework may be conducted by UX clients (or other executing processes) irrespective of the operating system of the requesting computing device. Advantageously, by providing a micro-service framework 302 whose access is platform independent, the various micro-services offered by the various remote computing systems, as represented in the micro-service catalog 360, become cross-platform services. For example, assume that an executable app, such as app 324, has a desired functionality F(n), but that the app 324 is only available on a computing device running an operating system O. In current circumstances, this means that the desired functionality F(n) is not available to any other computer user that does not have a computing device that implements the requisite operating system O. However, by providing a micro-service framework 302 that can be accessed by UX clients (or other executable processes) irrespective of the operating system upon which they operate, the desired functionality F(n) can be accessed from any network-capable computing device.

Regarding the micro-service framework 302, while not shown in FIG. 3, the micro-service framework typically operates on a computing device, or across multiple computing devices and is accessible to a UX client 354 over a network 340. Moreover, in various embodiments, more than one instance of the micro-service framework 302 may be implemented and accessible over a network, both for redundancy purposes as well as distributing access across multiple, cooperative instances. Further still, the micro-service catalog 360 may be maintained and accessible to UX clients, such as UX client 354, by way of an instance of the micro-service framework 302.

Regarding routines 100 and 200 described above, as well as other processes that may be described herein such as the interaction described in regard to the interaction between UX clients, the micro-service framework 302, apps, and remote, online services, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the routines and/or processes include various novel features of the disclosed subject matter, other steps (not listed) may also be included and carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 6 below. Additionally, in various embodiments all or some of the various routines may also be embodied in executable hardware modules including, but not limited to, system on chips (SoC's), codecs, specially designed processors and or logic circuits, and the like on a computer system.

As suggested above, these routines and/or processes are typically embodied within executable code modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 4:
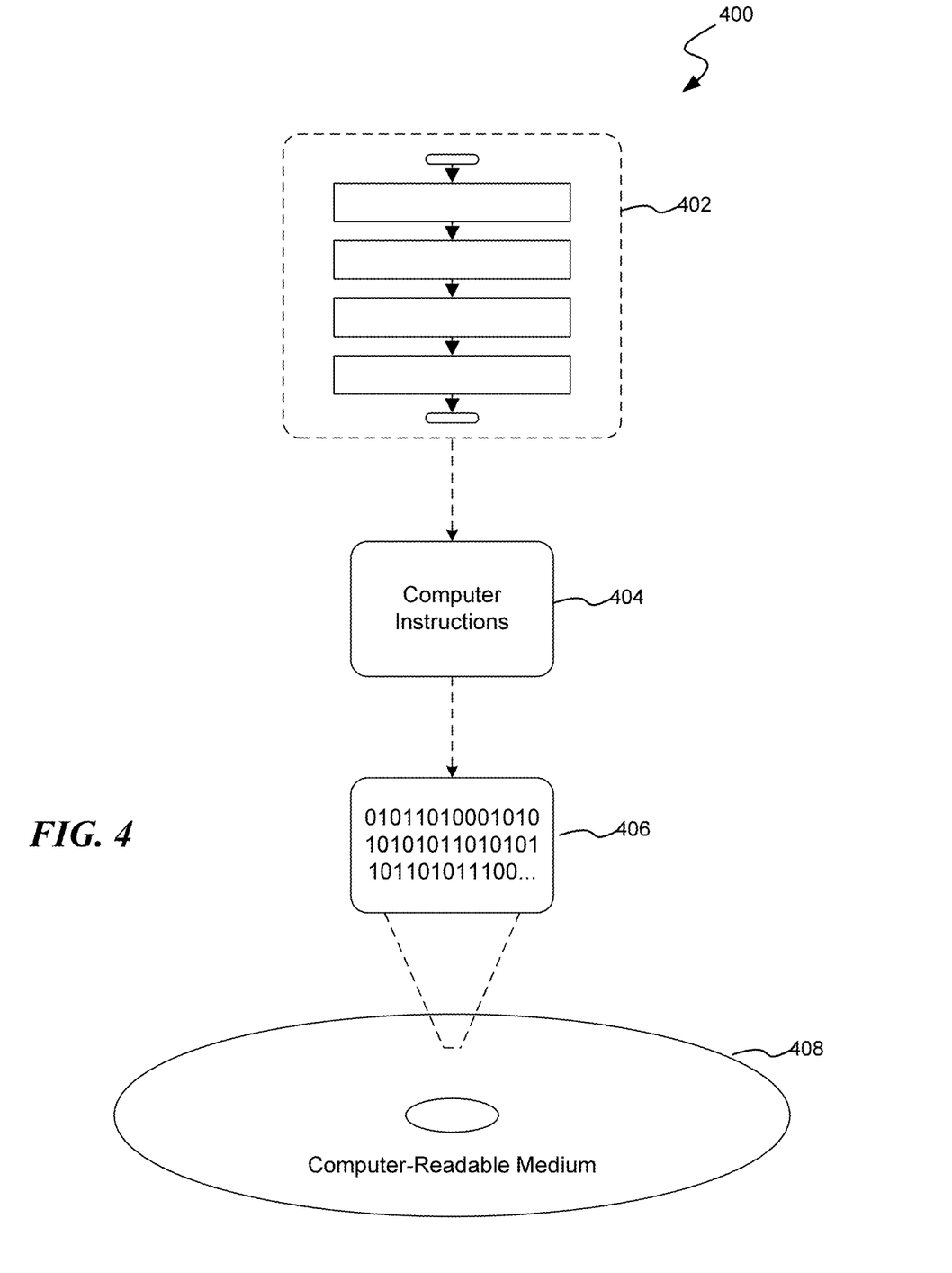
FIG. 4 is a block diagram illustrating an exemplary computer readable medium encoded with instructions, such as instructions for identifying micro-services within apps, or processing requests for micro-services.

Regarding computer readable media, FIG. 4 is a block diagram illustrating an exemplary computer readable medium encoded with instructions, such as instructions for identifying micro-services within apps, or processing requests for micro-services, as described above. More particularly, the implementation 400 comprises a computer-readable medium 408 (e.g., a CD-R, DVD-R or a platter of a hard disk drive), on which is encoded computer-readable data 406. This computer-readable data 406 in turn comprises a set of computer instructions 404 configured to operate according to one or more of the principles set forth herein. In one such embodiment 402, the processor-executable instructions 404 may be configured to perform a method, such as at least some of exemplary method 100 or 200, for example. In another such embodiment, the processor-executable instructions 404 may be configured to implement a system on a computing device, such as at least some of the exemplary, executable components of system 500, as described below. Many such computer readable media may be devised, by those of ordinary skill in the art, which are configured to operate in accordance with the techniques presented herein.

Figure 5:
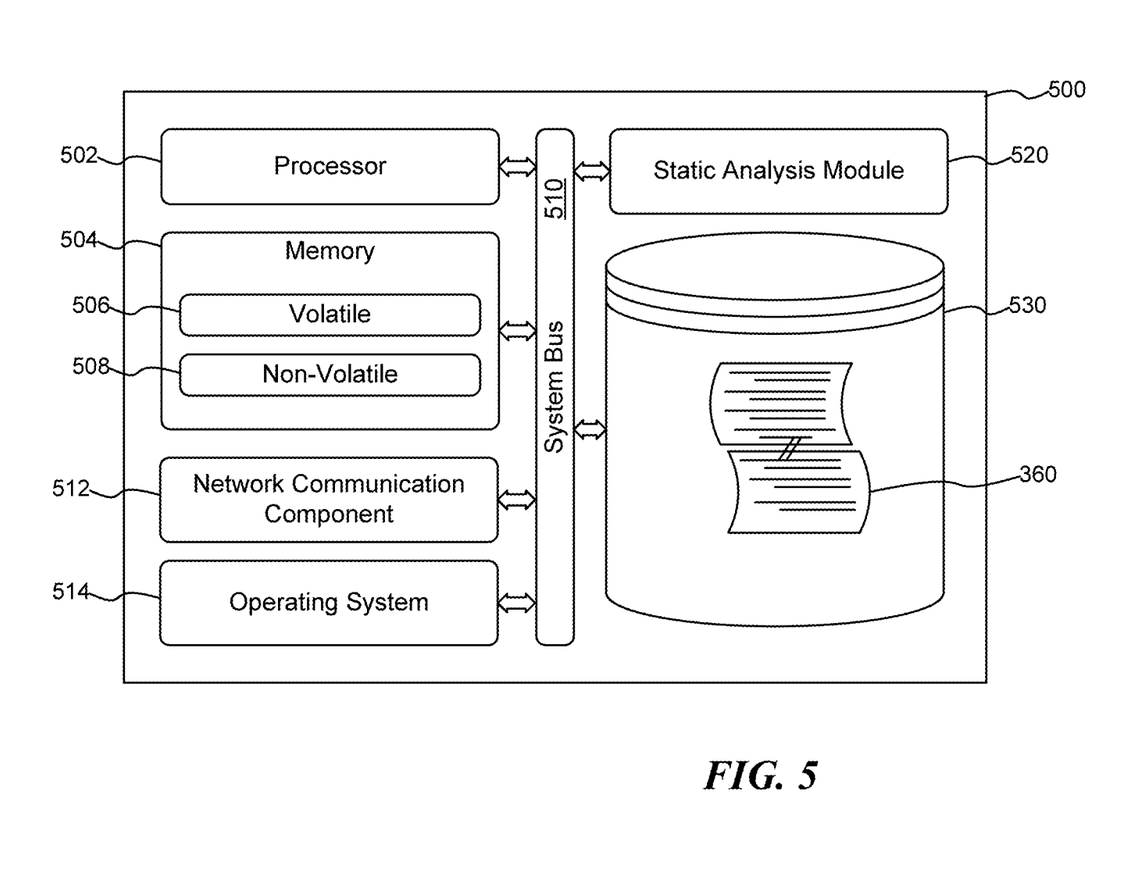
FIG. 5 is a block diagram illustrating an exemplary computing device suitable for implementing aspects of the disclosed subject matter, particularly in regard identifying deep links/APIs within an app and storing that information in a micro-service catalog.

Turning now to FIG. 5, FIG. 5 is a block diagram illustrating an exemplary computing device 500 suitable for implementing aspects of the disclosed subject matter, particularly in regard identifying deep links/APIs within an app and storing that information in a micro-service catalog 360. The exemplary computing device 500 includes one or more processors (or processing units), such as processor 502, and further includes a memory 504. The processor 502 and memory 504, as well as other components, are interconnected by way of a system bus 510.

As will be appreciated by those skilled in the art, the memory 504 typically (but not always) comprises both volatile memory 506 and non-volatile memory 508. Volatile memory 506 retains or stores information so long as the memory is supplied with power. In contrast, non-volatile memory 508 is capable of storing (or persisting) information even when a power supply is not available. Generally speaking, RAM and CPU cache memory are examples of volatile memory 6506 whereas ROM, solid-state memory devices, memory storage devices, and/or memory cards are examples of non-volatile memory 508.

As also appreciated by those skilled in the art, the processor 502 executes instructions retrieved from the memory 504 (and/or from computer readable media, such as computer readable media 500 of FIG. 4) in carrying out various functions of performing a static analysis to identify deep links within one or more apps, as set forth above. The processor 502 may be comprised of any of a number of available processors such as single-processor, multi-processor, single-core units, and multi-core units.

Further still, the illustrated computing device 500 includes a network communication component 512 for interconnecting this computing device with other devices and/or services over a computer network, such as network 330 of FIG. 3. The network communication component 512, sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 512, is typically comprised of hardware and/or firmware components (and may also include or comprise executable software components) that transmit and receive digital and/or analog signals over a transmission medium (i.e., the network.)

In addition, the exemplary computing device 500 includes an operating system 514 that provide system software that manages both hardware and software resources of the computing device. The operating system also provides a common set of services for the execution of computer programs and other executable modules.

According to aspects of the disclosed subject matter, the exemplary computing device 500 also includes a static analysis module. Typically, though not exclusively, the static analysis module is implemented as an executable module that, in execution, causes the exemplary computing device 500 to conduct a static analysis of one or more apps (and/or applications) in discovering their deep links, and then in capturing details of the discovered deep links in a micro-service catalog 360, as described above in regard to routine 100 of FIG. 1.

Still further included in the exemplary computing device 500 is a data store 530 that stores the micro-service catalog 360. Of course, while FIG. 5 illustrates that the exemplary computing device 500 includes this data store, in various embodiments the micro-service catalog 360 may be maintained externally to the exemplary computing device 500, in which case the static analysis module 520 would also be configured to access the catalog 360 across a network in order to update as described above.

Figure 6:
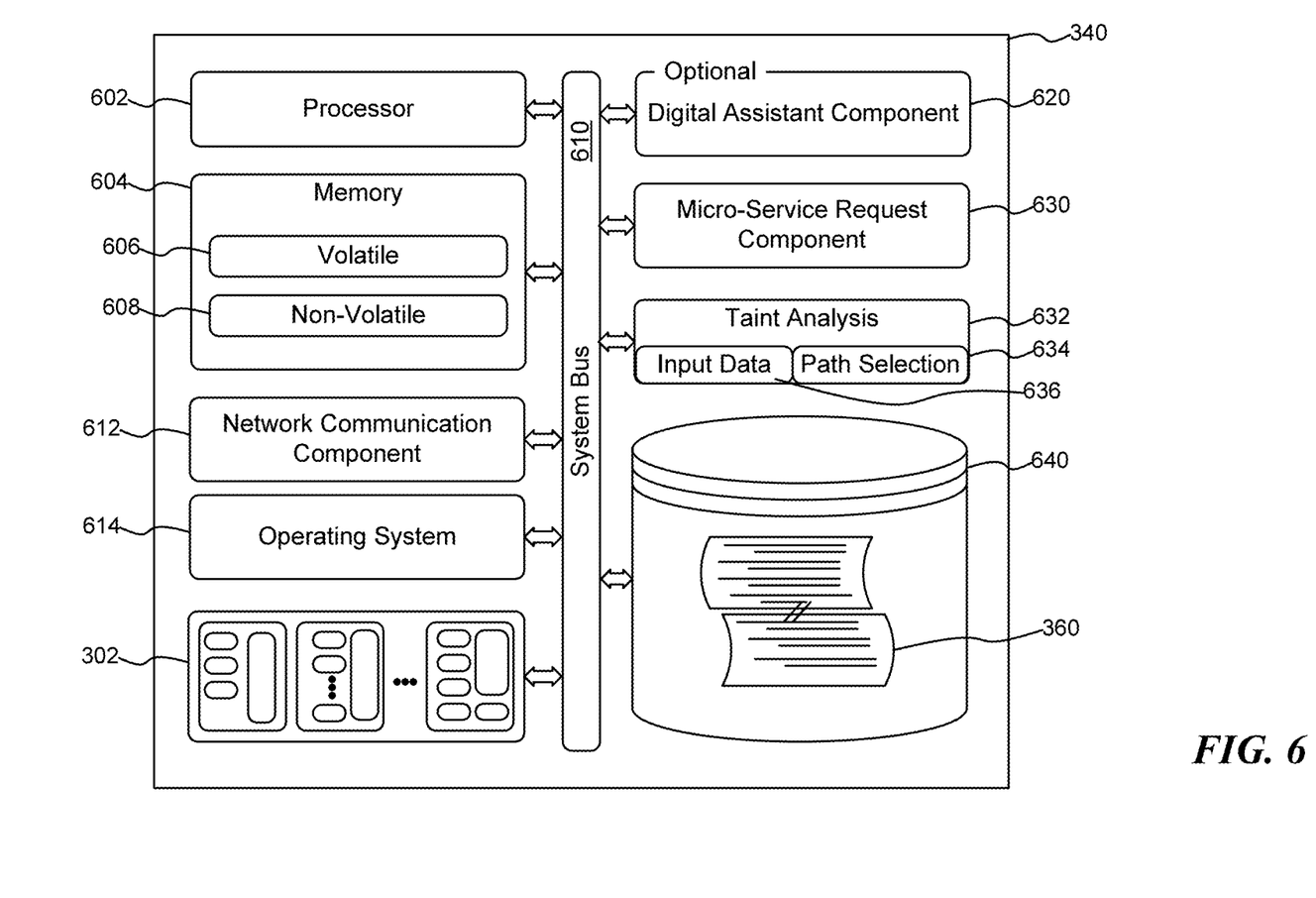
FIG. 6 is a block diagram illustrating an exemplary computing device suitable for responding hosting a micro-service framework as well as processing requests on the micro-service framework.

Turning to FIG. 6, FIG. 6 is a block diagram illustrating an exemplary computing device 340 suitable for responding hosting a micro-service framework 302, as well as processing requests on the micro-service framework, as described above in regard to routine 200 of FIG. 2. In similarity to the exemplary computing device 500 of FIG. 5, the exemplary computing device 340 includes one or more processors (or processing units), such as processor 602, a memory 604, a system bus 610, and a network communication component 614. The memory 604 includes volatile memory 606 and non-volatile memory 608. The processor 602 and memory 604, as well as other components, are interconnected by way of the system bus 610. Communication with external devices is carried out by way of the network communication component 612. Also, the exemplary computing device 340 also includes an operating system 614.

In addition to the above, the exemplary computing device 340 optionally includes a UX client component 620. In some embodiments, the UX client component 620 operates to provide UX client services to a computer user. While a UX client may operate on a user's computing device, a local UX client may rely upon the UX client component 620 for all or some of the services necessary to assist the user. These services may include the identification of desired micro-services as found in a micro-service catalog 360 stored in a data store 640, or in executing the micro-services via a micro-service framework 302 hosted on the computing device 340.

Still further, in one embodiment, the exemplary computing device 340 also includes a micro-service request component 630. The micro-service request component 630 receives micro-service requests, typically (though not exclusively) from a UX client component 620, and processes them by way of the micro-service framework 302.

As described above, the micro-service request component 630 utilizes one or more taint analysis modules, such as taint analysis module 632. In the non-limiting example shown in FIG. 6, the taint analysis module 632 includes an input data component 636 that is used to identify those input parameters of complex data structures that are used in a valid, feasible execution path. The path selection component 634 is used to identify or differentiate between valid/feasible and invalid/infeasible execution paths.

Regarding the various components of the exemplary computing devices 500 and 600, those skilled in the art will appreciate that many of these components may be implemented as executable software modules stored in the memory of the computing device, as executable hardware modules and/or components (including SoCs—system on a chip), or a combination of the two. Indeed, components may be implemented according to various executable embodiments including executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions and features described herein.

Moreover, in certain embodiments each of the various components of the exemplary computing devices 500 and 600 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network as in known in the art.

Figure 7:
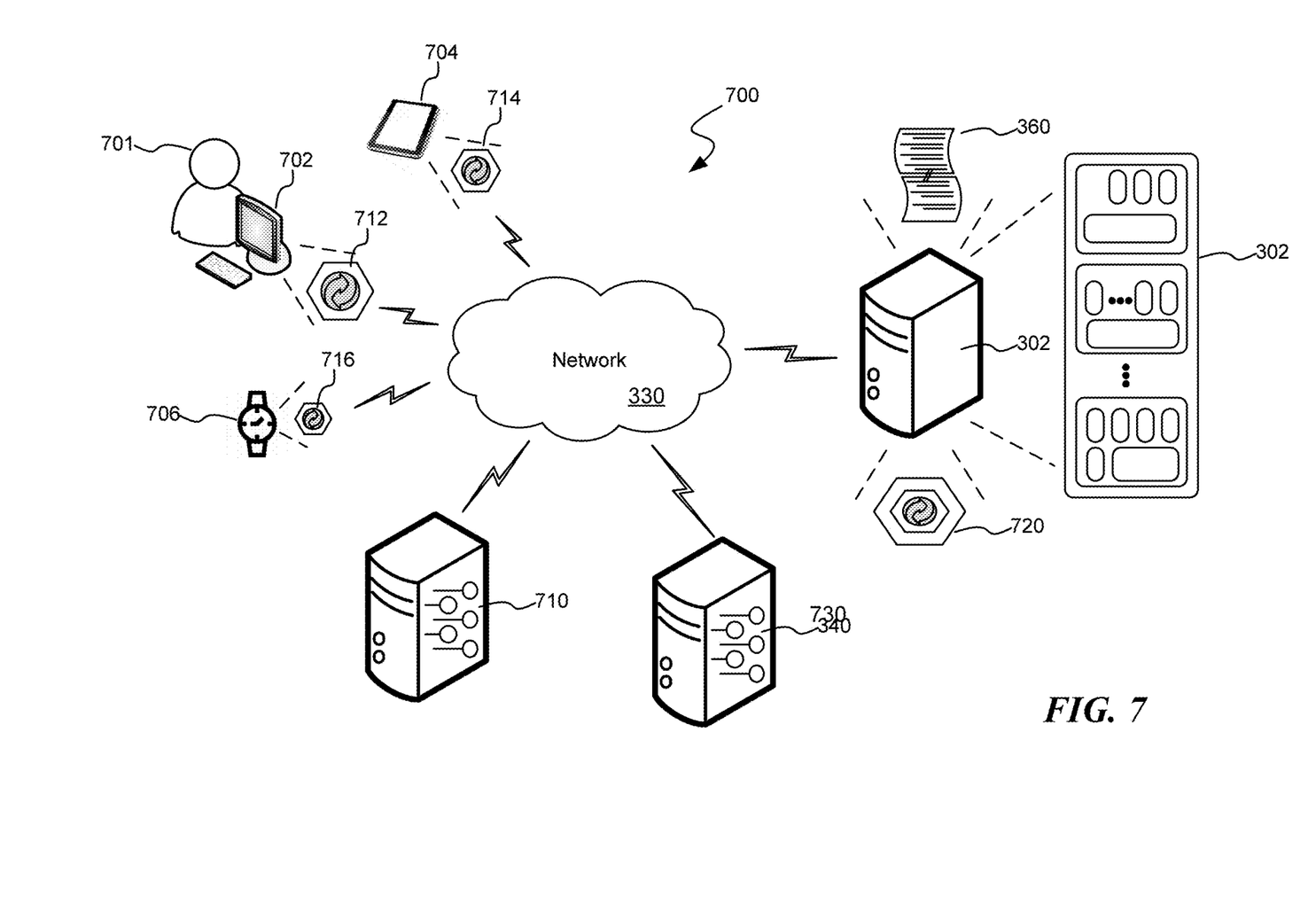
FIG. 7 is a block diagram illustrating an exemplary network environment suitable for implementing aspects of the disclosed subject matter.

Turning now to FIG. 7, FIG. 7 is a block diagram illustrating an exemplary networked environment 700 suitable for implementing aspects of the disclosed subject matter. The network environment includes one or more user computing devices, such as user computing devices 702-706, connected to a network 330. By way of illustration and not limitation, suitable user computing devices may include a wide variety of user devices including smart watches such as smart watch 706, desk-top computers such as desktop computer 702, tablet computers such as tablet computer 704, laptop computers, mobile phones, so-call phablets devices (a cross between a mobile phone and a tablet), wearable computing devices, and the like. Suitably configured computing devices include, in execution, a UX client, such as UX client 712-716. As will be readily appreciated, each UX client may be implemented as a light UX client, in which all requests are simply forwarded onto a back-end UX client service 720 (as may be provided through the execution of the UX client component 620 of FIG. 6) operating on a remote computing device 302. Further, a micro-service catalog 360 may be maintained by the remote computing device 302.

In operation and by way of example, as computer user 701 makes a request of the UX client 712, the micro-service catalog 360 may be consulted to identify which micro-services may be needed to complete the request. While not shown, all or some of the micro-service catalog 360 may be cached on the desktop computer 702 of the computer user 701. The UX client 712, executing on the desktop computer 702, may be configured to process all of the request or cooperatively work with the back-end UX client service 720 to identify the micro-services necessary to complete the request. Additional, after identifying those micro-services, the UX client 712, executing on the desktop computer 702, may be configured to process all of the request or cooperatively work with the back-end UX client service 720 to execute the micro-services, via the micro-service framework hosted on the remote computing device 302. As discussed above, as the various micro-services are executed, API calls to various hosting computing devices, such as computing device 710 and 730 are made over the network 330.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for identifying one or more micro-services of an app, the method comprising:
   identifying a first starting source of a target app, where the first starting source comprises a starting execution point of the target app;
   conducting an analysis of the target app with regard to the identified first starting source;
   identifying a first execution path within the target app as a result of the analysis of the target app with regard to the identified first starting source;
   capturing details regarding execution of the first execution path as a micro-service; and
   storing the captured details of the micro-service in a micro-service catalog.

2. The computer-implemented method of claim 1 further comprising:
   identifying a plurality of execution paths as a result of the analysis of the target app with regard to the identified first starting source, including the first execution path; and
   for each of the identified execution paths:
      capturing details regarding execution of an execution path as a micro-service; and
      storing the captured details of the micro-service in a micro-service catalog.

3. The computer-implemented method of claim 2 further comprising:
   identifying a plurality of starting sources of the target app, including the first starting source of the target app; and
   for each of the identified starting sources:
      conducting an analysis of the target app with regard to an identified starting source;
      identifying one or more execution paths within the target app as a result of the analysis of the target app with regard to the identified starting source;
      capturing details regarding execution of each of the one or more execution paths as a corresponding one or more micro-services; and
      storing the captured details of each of the one or more micro-services in a micro-service catalog.

4. The computer-implemented method of claim 3 further comprising:
   for each of the identified starting sources, identifying one or more input parameters corresponding to each of the one or more execution paths;
   wherein capturing details regarding execution of each of the one or more execution paths as a corresponding one or more micro-services comprises capturing details regarding execution of each of the one or more execution paths and the one or more input parameters corresponding to each of the one or more execution paths.

5. The computer-implemented method of claim 4, wherein identifying one or more execution paths within the target app as a result of the analysis of the target app with regard to the identified starting source comprises executing a path-selective taint analysis to filter out an infeasible or invalid execution path.

6. The computer-implemented method of claim 5, wherein identifying one or more input parameters corresponding to each of the one or more execution paths comprises executing a taint analysis of complex data structures to identify the one or more primitive-typed input parameters of the one or more execution paths.

7. The computer-implemented method of claim 1, wherein the analysis comprises a static analysis of the target app, irrespective of dynamic execution of the target app.

8. The computer-implemented method of claim 7, wherein the static analysis is augmented by a satisfiability modulo theory (SMT) solver.

9. A computer-implemented method for processing micro-service requests, the method comprising:
   providing a micro-service catalog, the micro-service catalog identifying a plurality of micro-services available for execution, where each of the micro-services of the micro-service catalog corresponds to one or more application programming interface (API) calls to an online service;
   receiving a request for a first micro-service of a computer user;
   identifying the one or more API calls of the first micro-service to an online service; and
   for each of the one or more API calls of the first micro-service:
      issuing the API call to the online service; and
   processing the return results of the API call for the computer user, wherein a micro-service framework provides one or more virtual machines by which the API call is executed and wherein the micro-service framework hosts a plurality of operating systems executing on a virtual machine of the one or more virtual machines.

10. The computer-implemented method of claim 9 further comprising:
   preparing input parameters according to data associated with the first micro-service;
   wherein issuing the API call to the online service comprises issuing the API call to the online service with the prepared input parameters.

11. The computer-implemented method of claim 10 further comprising:
   providing a micro-service framework, the micro-service framework being configured to:
      receive an execution request regarding a micro-service of the computer user; and
      execute the micro-service in response to the received execution request;
   wherein issuing the API call to the online service comprises issuing the API call to the online service by way of the micro-service framework.

12. The computer-implemented method of claim 11, wherein the micro-service framework implements one or more virtual machines upon which executable code may be executed.

13. The computer-implemented method of claim 12, wherein the micro-service framework hosts a plurality of operating systems executing on a virtual machine of the one or more virtual machines.

14. The computer-implemented method of claim 13, wherein each of the plurality of operating systems hosts at least one app executing on a virtual machine within the hosting operating system.

15. The computer-implemented method of claim 14, wherein issuing the API call to the online service by way of the micro-service framework comprises identifying an app corresponding to the requested micro-service and issuing the API call to the online service by way of the identified app executing in the micro-service framework.

16. The computer-implemented method of claim 15, wherein the micro-service request is received from an executing processes operating in a first operating environment that is distinct from the operating environment of the identified app.

17. A computer system for processing micro-service requests, the computer system comprising a processor and a memory, wherein the processor executes instructions stored in the memory as part of or in conjunction with additional components, the additional components comprising:
- a micro-service request component that, in execution on the computer system, is configure to:
  - receive a micro-service request of a computer user;
  - identify an application programming interface (API) call of an online service corresponding to the requested micro-service according to a micro-service catalog; and
  - execute the identified API call of the online service by way of a micro-service framework; and
- a micro-service framework hosted by the computer system, the micro-service framework being configured to:
  - receive an execution request regarding a micro-service of a computer user from the micro-service request component; and
  - execute the identified API call of the online service in response to the received execution request, wherein a micro-service framework provides one or more virtual machines by which the API call is executed and wherein the micro-service framework hosts a plurality of operating systems executing on a virtual machine of the one or more virtual machines.

18. The computer system of claim 17, wherein each of the plurality of operating systems hosts at least one app executing on a virtual machine of the one or more virtual machines within the hosting operating system.

19. The computer system of claim 18, wherein executing the identified API call of the online service in response to the received execution request comprises:
- identifying an app corresponding to the requested micro-service by way of the micro-service catalog; and
- issuing the API call to the online service by way of the identified app executing in the micro-service framework.

\* \* \* \* \*